July 22, 1924.

J. L. CREVELING

ELECTRIC REGULATION

Original Filed Nov. 1, 1916

1,502,373

Inventor,
John L. Creveling

Patented July 22, 1924.

1,502,373

UNITED STATES PATENT OFFICE.

JOHN L. CREVELING, OF WHITE PLAINS, NEW YORK, ASSIGNOR TO GOULD COUPLER COMPANY, A CORPORATION OF NEW YORK.

ELECTRIC REGULATION.

Application filed November 1, 1916, Serial No. 128,825. Renewed May 12, 1924.

*To all whom it may concern:*

Be it known that I, JOHN L. CREVELING, a citizen of the United States, residing in White Plains, county of Westchester, and State of New York, have invented certain new and useful Improvements in Electric Regulations, of which the following is a description.

My invention pertains to that class of electric regulation wherein it is desired to regulate the dynamo or generator in a predetermined manner, and has for a particular object to provide means whereby the same will be automatically regulated within narrow limits.

As my invention is particularly applicable to systems employing a generator to charge a storage battery and operate lamps or other translating devices in conjunction therewith, and wherein the generator is subject to variations in speed, as in carlighting systems having a generator driven from the car axle, it will be described with reference to such a system.

Figure 1:
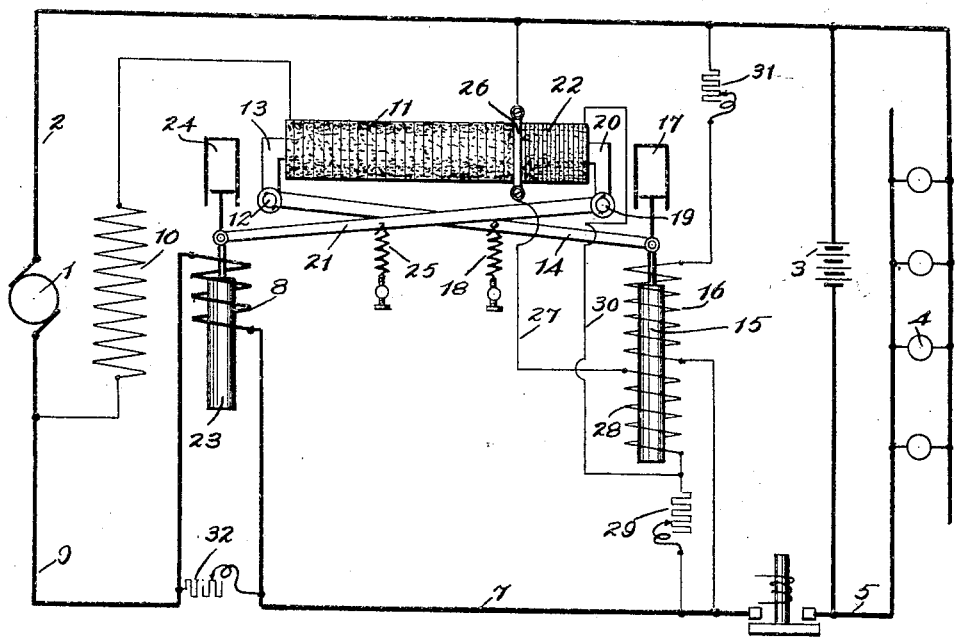
Figure 2:
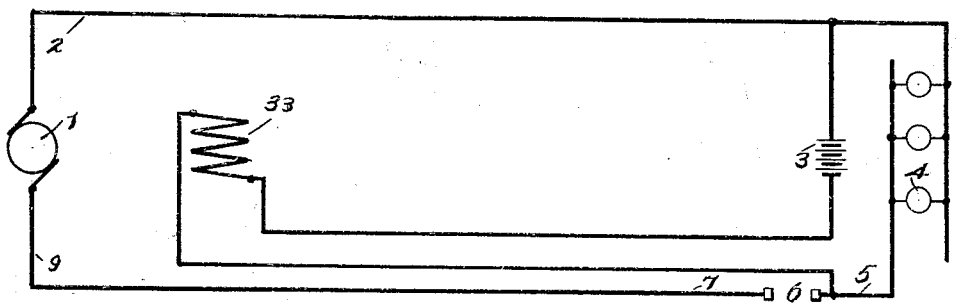
Figures 3, 4, 5:
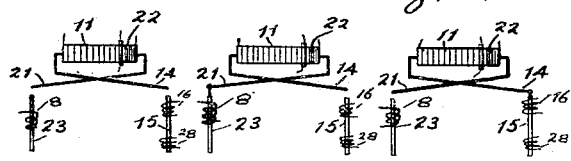

In the drawing, Fig. 1 is a diagrammatic representation of one type of such system chosen to illustrate one embodiment of my invention;

Fig. 2 is a diagrammatic representation of a modification which may be made in the system of Fig. 1; and Figs. 3, 4 and 5 are diagrammatic representations of a portion of the system of Fig. 1, showing different arrangements of parts thereof which fall within the scope of my invention.

In the drawing, 1 represents a dynamo or generator the positive terminal of which is connected as by lead 2 with the positive side of the storage battery 3 and lamps or other translating devices 4. The battery and translating devices have their negative terminals connected with the wire 5, carried to one terminal of the switch 6, the opposite terminal of which is connected as by lead 7 with one end of the coil or solenoid 8, the opposite end of which is connected as by lead 9 with the negative side of the generator. The generator is provided with field energizing means, in this instance indicated as a shunt coil 10 having in series therewith a suitable regulating resistance indicated as a carbon pile 11. It will therefore be obvious that the operation of the generator may be regulated by proper manipulation of the pressure and consequent resistance of the pile 11. 12 is a stud or pivot supporting a bell-crank lever provided with the short arm 13 and the long arm 14, which has cooperating therewith at its free extremity a core of iron or other magnetic material 15, surrounded by a coil 16 in shunt across the generator circuit and adapted when energized to tend to raise the core 15 smoothly against the action of dashpot 17, in such manner as to raise the lever 14 against the action of adjustable spring 18 and swing the lever 13 about the pivot 12 and relieve the pressure upon the pile 11, to control the operation of the generator. 19 is a stud or pivot carrying the bell-crank lever having the short arm 20 and the long arm 21 so arranged as to control the pressure upon and consequent resistance of the carbon pile 22. The free extremity of the lever 21 has cooperating therewith a core of iron or other magnetic material indicated at 23, so positioned within the coil 8 that when the said coil is energized it tends to lift the core smoothly against the action of the dashpot arrangement 24, and to lift the lever 21 against the action of the adjustable spring 25, so as to increase the resistance of the pile 22. The pile 22 has one end in contact with the abutting member or disk 26 of conducting material. Member 26 is connected with the lead 2 and may serve also as an abutting member or disk for the pile 11, and may be fixed or stationary, as indicated in the drawing. The wire 27 is carried from the member 26 to one end of a coil 28, having its opposite end connected through the adjustable resistance 29, with the lead 7. The coil 28 when energized tends to lift the core 15 and increase the resistance of the pile 11. The remaining end of the pile 22 is connected as by wire 30 to a point between the coil 28 and the resistance 29, and is therefore in shunt to the coil 28. And, owing to the effect of the resistance 29, the resistance of pile 22 will therefore control the current flowing in the coil 28. 31 is an adjustable resistance in series with the coil 16 whereby the operation of the said coil may be adjusted. 32 is a variable resistance in shunt across the coil 8 whereby its operation may be adjusted.

In Fig. 2 the only modification intended to be brought out is the coil 33 shown in series with the battery circuit which may be used in place of the coil 8 of Fig. 1 in series with the generator circuit.

In Fig. 1 the cores 15 and 23 are shown as pivotally connected with their respective levers 14 and 21. In Fig. 3 the said cores are indicated as detached from the levers but capable of engaging the same when moved upwardly by their respective coils or solenoids, in such manner that they first make contact with their cooperating levers and then further movement swings their cooperating levers to affect their respective resistances. In Fig. 4 the core 23 is shown as united with its lever 21, while the core 15 is shown as separated from its lever 14 but adapted to engage the same to cooperate therewith when lifted by coils 16 and 28. In Fig. 5 the lever 14 is shown as connected with its core 15, while the core 23 is shown as detached but capable, under the influence of coil 8, of engaging the lever when moved in an upward direction so as to manipulate resistance 22.

The switch 6 may be of any suitable type, and I prefer to use one of the usual automatic switches which will close its circuit when the voltage of the generator is substantially equal to that of the storage battery and open the circuit when the generator voltage falls very slightly below that of the battery, in such manner as to prevent back discharge from the battery through the generator. As these switches are well known in the art, and the particular type used forms no part of my present invention, details are purposely omitted for the sake of brevity.

An operation of my invention is substantially as follows:

If the generator be at rest or operating at sufficiently low speed, switch 6 will be open and the translating devices may be supplied by the storage battery in a well known manner. If the generator have its voltage brought up to slightly in excess of that of the storage battery, switch 6 will close and the generator will then supply current to the battery and translating devices in multiple therewith. Current will also flow through coil 16 and tend to lift the core 15, while a negligible current will flow through coil 28 as the same is practically shunted out or short-circuited by the pile 22 which, while diverting practically all the current away from the coil 28, will not consume much of the generator current, as a relatively high resistance is employed at 29. With the resistance 29 adjusted as desired and the coil 28 shunted out by pile 22, I so adjust the resistance 31 and the spring 18 that, if the generator impress the maximum desired voltage across the circuit whose voltage is measured by coil 16, in this instance indicated as the generator circuit for illustration, the said coil 16 will then raise the core 15 smoothly against the action of dashpot 17 and spring 18 in such manner as to so manipulate the lever 14 as to properly vary the resistance 11 to prevent this maximum desired voltage from being exceeded. If while so operating with the generator regulated by the coil 16 and its cooperating parts the current supplied by the generator tends to increase above the predetermined desirable limit in the circuit whose current is measured by the coil 8, in this instance shown as in the main circuit for example, I so adjust the shunt 32 and spring 25 that coil 8 will raise the core 23 evenly against the action of dashpot 24 and spring 25 and, by cooperation with the lever 21, lessen the pressure upon the pile 22 to increase the resistance thereof, which in turn will increase the current flowing in the coil 28, which coil will then lift the core 15 so as to increase the resistance 11 and cut down the generator field to prevent the generator from exceeding this desired current.

As the storage battery 3 has a very low resistance in practice, the fluctuations in current in the coil 8, and the corresponding fluctuations in resistance of the pile 22 and their accompanying fluctuations in current in the coil 28, will be so large as compared with the fluctuations in voltage taking place across the coil 16 that the regulation now may be considered as entirely carried out by the coil 8 and its cooperating parts, and the coil 16 may be considered as having a magnetomotive force which may be regarded as a constant quantity playing no part in the regulation, unless a perceptible change in voltage across the coil takes place, which will not occur so long as the slight changes in voltage cause large changes in current or until substantially the maximum voltage at which coil 16 is capable of performing the regulation of the generator is reached, or slightly exceeded, in which event the said coil will control the voltage of the generator. And if the battery voltage rise or the external resistance increase until this standard voltage is insufficient to cause the maximum current to be delivered, then the voltage will simply be held, and the current, by falling below the maximum, will allow core 23 to descend and gradually shunt out coil 28, and the entire regulation will be performed by the voltage regulating coil 16, as first above outlined.

An operation of that modification shown in Fig. 2 is substantially the same as that outlined above, with the exception that it is the current in the battery circuit that is limited by the coil 33, instead of the generator current that is limited by the coil 8 in Fig. 1.

In the modification shown in Fig. 3 the operation will be the same, except that there will be no difference in the pull exerted by the springs 18 and 25 upon the respective piles tending to compress the same, caused by fluctuations in either the voltage or current, so long as the same are insufficient to lift the cores into contact with the levers, which, under some conditions, is an arrangement which I prefer.

In the modification shown in Fig. 4 some fluctuations in the coil 8 will be felt by the pile 22 below the maximum value which is required to lift the core 23 and perform the function of regulation, while no fluctuations will be felt by the pile 11 until the core 15 is first raised and brought into contact with its respective lever 14.

In that modification shown in Fig. 5 voltage fluctuations may affect the operation of the pile 11 slightly before reaching the maximum value, while coil 8 will in no way affect pile 22 until the magnetomotive force thereof is sufficient to first lift the core 23 and bring the same into operative contact with its lever 21.

From the foregoing it will be obvious that my invention provides a system wherein the generator will be automatically regulated in such manner that current in a circuit cannot be exceeded even though the generator speed be greatly increased and the voltage across a circuit may be held from exceeding predetermined limits, and that, notwithstanding the voltage coil and current coil cause the regulating resistance 11 to be affected through the instrumentality of the same lever 13—14, when the voltage coil 16 is operating the said lever, it does so independently of the fluctuations in current in the coil 8 until the current in the coil 8 is sufficient to operate the lever 21, when the fluctuations in current may perform substantially the entire regulation for speed changes through the instrumentality of coil 28, as the fluctuations therein may be so large as compared with the minor fluctuations in coil 16 that the regulating value of the coil 16 is substantially nil as compared therewith.

I do not wish in any way to limit myself to any of the exact constructions or details of operation given above to illustrate one embodiment of my invention, for it will be obvious that wide departure may be made without departing from the spirit and scope thereof which is set forth in the following claims.

What I claim is:

1. The combination with a generator and a regulating element by manipulation of which the generator may be regulated, of means for operating said element to regulate the generator to compensate for speed changes responsive to voltage fluctuations, and means comprising a shunt coil magnetically cooperating with the voltage responsive means to operate said element to regulate the generator to compensate for speed changes independently of the voltage fluctuations.

2. The combination with a generator and a regulating element by manipulation of which the generator may be regulated, of means for operating said element responsive to voltage fluctuations to produce voltage regulation, and means comprising a shunt coil magnetically cooperating with the voltage responsive means to operate said element to regulate the generator and means for controlling said shunt coil independently of the voltage fluctuations to produce current regulation.

3. The combination with a generator and regulating means therefor, of means for operating the regulating means responsive to voltage fluctuations, electromagnetic means including a shunt coil for assisting and dominating said voltage responsive means and operating the regulating means to regulate the generator and current responsive means controlling the dominating means to cause the generator to be regulated in response to current fluctuations by varying the effect of the dominating means.

4. The combination with a generator and regulating means therefor, of means for operating the regulating means to compensate for speed changes of the generator responsive to voltage fluctuations, electromagnetic means comprising a shunt coil for dominating said voltage responsive means and operating the regulating means to regulate the generator for speed changes and means controlling said electromagnetic means responsive to fluctuations in current.

5. The combination with a generator and a regulating element for controlling the same, of means for controlling said element, voltage responsive means adapted under predetermined conditions to operate said controlling means, electromagnetic means assisting the voltage responsive means and capable of operating said controlling means, and current responsive means controlling said electromagnetic means and effecting current regulation by varying said control.

6. The combination with a generator provided with field exciting means, an element manipulation of which affects said field exciting means, means for affecting said element to regulate the generator to compensate for speed changes in response to voltage fluctuations, a shunt coil for operating said element, and current responsive means controlling said shunt coil.

7. The combination with a generator and an element controlling the operation thereof, of means for operating said controlling element in response to voltage fluctuations comprising a mechanical structure affecting said element and electromagnetic means for operating said structure, of a second electromagnetic means for operating such structure and current responsive means controlling said second electromagnetic means in the operation of said structure whereby the generator is regulated in response to current fluctuations.

8. Means for regulating a generator comprehending a regulating device, means for affecting said device in response to voltage fluctuations, means for assisting and usurping the function of the voltage responsive means, and current responsive means, controlling said usurping means to regulate the generator.

9. The combination with a generator, of regulating means controlling the same, voltage responsive means for automatically operating the regulating means, electromagnetic means for assisting and ultimately substantially dominating the voltage responsive means, a variable resistance element controlling said electromagnetic means, and current responsive means controlling the operation of said resistance element to produce current regulation.

10. The combination with a generator and a regulator therefor comprehending a compressible pile, of independently movable members operating upon each end of said pile, means for dividing said pile, in effect, into independent portions, voltage responsive means for affecting one of the above mentioned members to affect one portion of said pile, and means cooperating with the voltage responsive means affected by manipulation of another portion of said pile.

11. The combination with a generator and a regulator therefor comprehending a compressible pile, of independently movable members operating upon each end of said pile, means for dividing said pile, in effect, into independent portions, voltage responsive means for affecting one of the above mentioned members to affect one portion of said pile, means cooperating with the voltage responsive means affected by manipulation of another portion of said pile, and responsive means affecting the member controlling the last named portion of the pile.

12. The combination with a generator and a regulator therefor comprehending a compressible pile, of independently movable members operating upon each end of said pile, means for dividing said pile, in effect, into independent portions, voltage responsive means for affecting one of the above mentioned members to affect one portion of said pile, means cooperating with the voltage responsive means affected by manipulation of another portion of said pile, and current responsive means affecting the member controlling the last named portion of the pile.

13. The combination with a variable speed dynamo and a storage battery charged thereby, of means for regulating the dynamo, voltage responsive means for operating the regulating means to hold the voltage impressed across the battery from exceeding a predetermined limit throughout speed changes of the dynamo, means for affecting the voltage responsive means and usurping the regulation of the dynamo, means for controlling the operation of the usurping means, and current responsive means for operating said controlling means and regulating the generator to prevent a predetermined current to the battery from being exceeded by the dynamo throughout speed changes irrespective of the voltage impressed across the voltage responsive means.

14. An electric regulator comprehending a compressible pile, independently movable means for operating upon each end of said pile and responsive means for moving said movable means, of means dividing said pile in effect into independent portions and means affected by the operation of one portion for affecting the responsive means operating another portion.

15. An electric regulator comprehending a compressible pile, independently movable means for operating upon each end of said pile and responsive means for moving said movable means, of means dividing said pile in effect into independent portions and means affected by the operation of one portion for electro-magnetically affecting the responsive means operating another portion.

16. The combination with a generator and a regulator therefor comprehending a compressible pile, independently movable means for operation upon each end of said pile and responsive means affected by the operation of the generator for moving said movable means, of means dividing said pile in effect into independent portions and means affected by the operation of one portion for affecting the responsive means operating another portion.

17. The combination with a generator and a regulator therefor comprehending a compressible pile, independently movable means for operation upon each end of said pile and responsive means affected by the operation of the generator for moving said movable means, of means dividing said pile in effect into independent portions and means affected by the operation of one portion for electro-magnetically affecting the responsive means operating another portion.

JOHN L. CREVELING.